United States Patent [19]

Bossen et al.

[11] 3,876,978

[45] Apr. 8, 1975

[54] ARCHIVAL DATA PROTECTION

[75] Inventors: Douglas C. Bossen, Wappingers Falls; Mu-Yue Hsiao, Poughkeepsie; Arvind M. Patel, Wappingers Falls, all of N.Y.

[73] Assignee: International Business Machines Corporation, Armonk, N.Y.

[22] Filed: June 4, 1973

[21] Appl. No.: 366,936

[52] U.S. Cl. .............. 340/146.1 AG; 235/153 AM; 340/146.1 AL; 340/146.1 F; 360/53

[51] Int. Cl. ... G11b 27/36; G06f 11/10; G06k 5/02

[58] Field of Search ... 235/153 AM; 340/146.1 AG, 340/146.1 F, 174 ED, 174.1 B, 174.1 R, 176.1 AL; 360/53

[56] References Cited

UNITED STATES PATENTS

| | | | |
|---|---|---|---|
| 2,941,738 | 6/1960 | Burke et al. | 340/174.1 R |
| 3,037,697 | 6/1962 | Kahn | 340/146.1 AL |

OTHER PUBLICATIONS

Burnstine, D. C. et al., Memory Error Correction, in IBM Tech. Disc. Bull. 10(10): March, 1968, p. 1486–1487.

Goldberg, S. L. et al., Data Security and Recovery Technique, in IBM Tech. Disc. Bull. 14(11): April 1972, p. 3286–3287.

Louis, R. et al., Safeguarding of Stored Records Against Total Data Loss, in IBM Tech. Disc. Bull. 14(12): May, 1972 p. 3846.

*Primary Examiner*—Charles E. Atkinson
*Assistant Examiner*—R. Stephen Dildine, Jr.
*Attorney, Agent, or Firm*—James E. Murray

[57] ABSTRACT

This specification describes a system for preventing the catastrophic loss of data in one storage unit of a storage system comprised of a plurality of such storage units. In this system one of the plurality of storage units is used to store parity bits for the storage system, bit position by bit position. To be more specific, if the data in each of the storage units is considered to be a linear string of bits the storage unit containing the parity bits would contain a parity or Exclusive OR sum of all the first bits of all the storage units or, in a more general case, the $j^{th}$ bit of the check storage unit is the parity or Exclusive OR sum of all the $j$ bits of all the storage units.

2 Claims, 3 Drawing Figures

ARCHIVAL DATA PROTECTION

BACKGROUND OF THE INVENTION

The present invention relates to the restoration of destroyed data and, more particularly, to such restoration in a storage system comprised of a plurality of storage units.

Many storage systems are comprised of a plurality of separate storage units each containing different data. Data within these storage units is protected against loss by error correction schemes. However, such error correction schemes do not protect against a catastrophic loss of data such as the total loss of one or more of the storage units. In order to insure against such a loss certain techniques have been used in the past such as journaling and duplication of all the data in a separate set of storage units. The result of these techniques is that the data in one of the storage units of the duplicated set can be used in the place of that in the destroyed original storage unit. However, such one-for-one backup technique is quite expensive since it requires an additional storage unit for each actually used.

SUMMARY OF THE PRESENT INVENTION

In accordance with the present invention the need for duplication of storage units is eliminated without materially increasing the complexity of the storage system. This is done by using a check bit system that, in its simplest form, requires only one additional storage unit. Assume that there are n storage units for storing data in the system. Each of the data storage units can then be considered to contain a string of data bits and, like the data storage units, the check bit unit can also be considered a string of data bits. Then, in accordance with the check bit system, the first bit of the string in the check unit is the Exclusive OR sum of all the first bits in the strings in all data storage units, the second bit in the string of the check bit unit contains the Exclusive OR sum of all the second bits of the strings in all the data storage units and so on. Or, more generally speaking, any $j^{th}$ bit of the check bit storage unit contains the parity of all the $j$ bits in the data storage units.

Therefore, it is an object of the present invention to prevent the catastrophic loss of data in the storage systems comprising a plurality of storage units.

A further object of the present invention is to reduce the amount of data that must be stored in order to insure against the loss of all or a great part of the data in one unit of a multiple unit storage system.

The foregoing and other objects, features and advantages of the present invention will be apparent from the following description of a preferred embodiment of the invention as illustrated in the accompanying drawings, of which:

DETAILED DESCRIPTION

Figure 1:
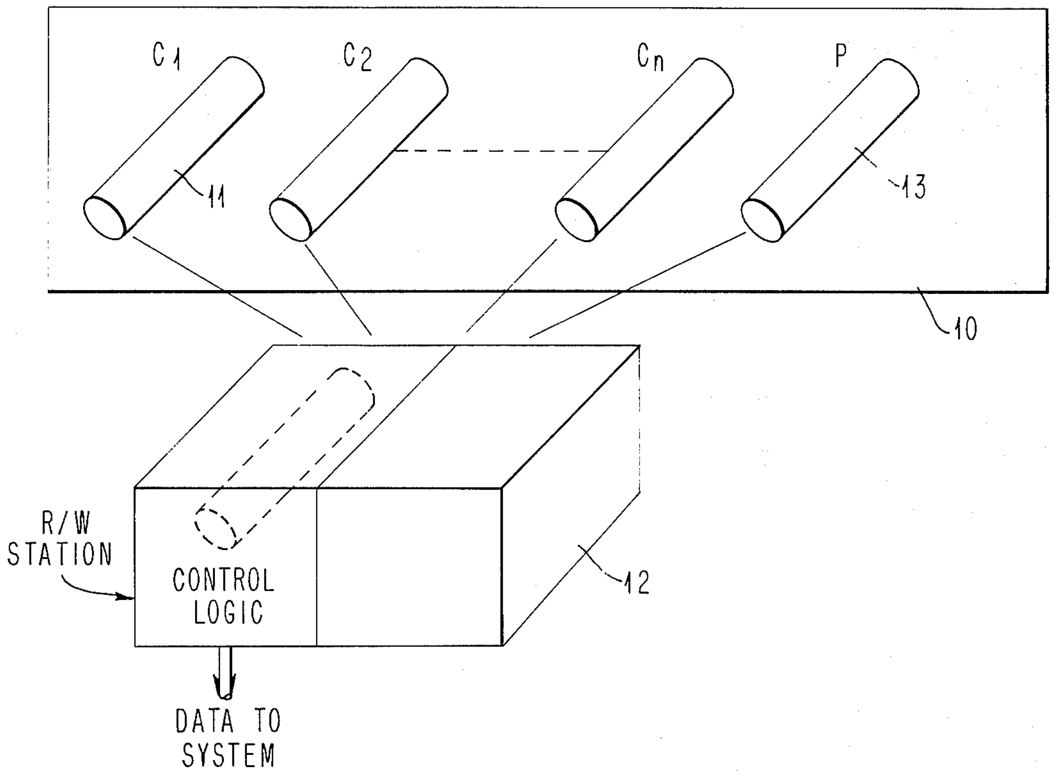
FIG. 1 shows a schematic drawing of a tape cartridge storage system employing the present invention.

Referring now to FIG. 1, cartridge library 10 contains a multiplicity of tape cartridges $c_1$ to $c_n$ each addressed by a read/write station 12 that accesses each of the cartridges individually and returns them to the library after they are used. The details of this system are not significant to the invention although it is important that the system contains a number of separate storage units 11 each containing data which is not necessarily reproduced in any of the other storage units. Therefore, upon failure of any one of these storage units, the data in that unit could be lost resulting in the necessity of reproducing the lost data from source material. In accordance with the present invention the need for referring back to the source material is eliminated without duplication of the cartridges $c_1$ to $c_n$ by the use of a separate check bit cartridge 13 containing the parity bits for the data in the storage cartridges 11.

Figure 2:
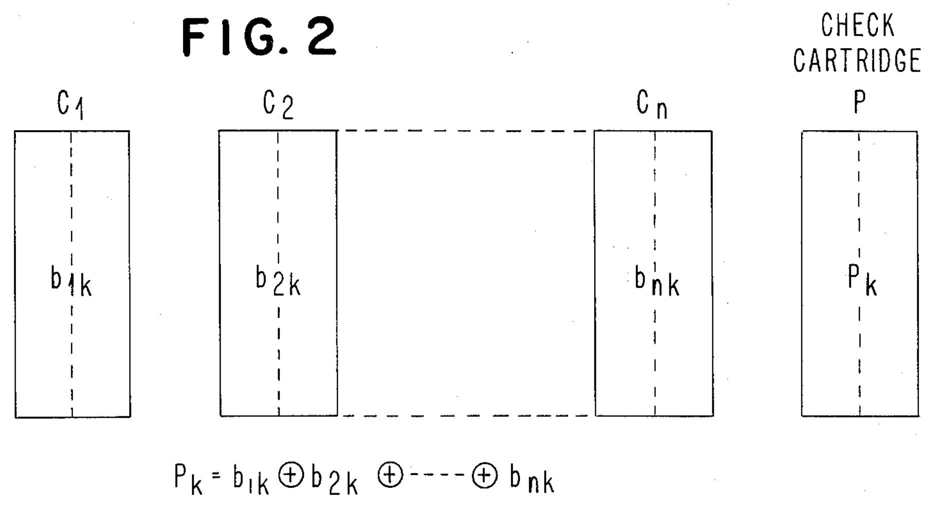
FIG. 2 is a schematic illustrating how the data of the particular cartridge of FIG. 1 is related to the data in the storage cartridge of FIG. 1.

By referring to FIG. 2 it can be seen how the parity bits of the check cartridge P relate to the data on the storage cartridges $c_1$ to $c_n$. The data in both the storage cartridges $c_1$ and $c_n$ and the check cartridge P can be considered as a linear string of bits, with the first bit of each occurring at the top of the figure and the last bit of the string at the bottom of the figure. When so considered the first bit of the check cartridge P is the Exclusive OR sum of all the first bits in cartridges $c_1$ to $c_n$ and the second bit in the check cartridge P is the Exclusive sum of all the second bits in the storage cartridges $c_1$ to $c_n$. Or, more generally speaking, the $j^{th}$ bit in the check cartridge P is the Exclusive OR sum of all the $j$ bits in cartridges $c_1$ to $c_n$.

To safeguard the data in the library using the parity cartridge concept the present invention has to perform three functions: (1) initially it must generate the parity bits in the check bit cartridge P from the data in the data cartridges $c_1, c_2, \ldots c_n$ of the library; (2) then when data in one of the cartridges, say cartridge $c_j$, is modified it must update the parity bits in the check bit cartridge P so that the check bit cartridge P always contains parity bits for current data; and (3) finally, when the data in one of the data cartridges, say cartridge $c_j$, is destroyed or lost, it must reconstruct that data using the data stored in the other data cartridges and in the check bit cartridge.

While it does not occur first in chronological order the updating of the parity bits, or function (2), will be discussed first to simplify understanding of the invention. Therefore, we must assume that the initial generation of the parity bits in the check bit cartridge, or function (1), has already been accomplished and that cartridge $c_j$ is at a read station for the purpose of changing data. Then, before any bit $b_{jk}$ on any cartridge $c_j$ is changed, the following relationship exists between that bit and the parity bit $P_k$ on check cartridge P.

$$P_k = b_{jk} \oplus \sum_{i \neq j} b_{ik} \qquad (2)$$

Now, if bit $b_{jk}$ is changed to $b'_{jk}$, the following constitutes the proper new value for the particular parity bit:

$$P'_k = P_k \oplus b_{jk} \oplus b'_{jk} \qquad (3)$$

What this says is that in order to properly update the parity cartridge when cartridge $c_j$ is being modified, all that is required is the bit pattern.

$$e_{jk} = b_{jk} \oplus b'_{jk} \qquad (4)$$

The set of bits specified in (4) is called a difference pattern. These bits $e_{jk}$ are then used (or possibly simultaneously) to update the parity cartridge according to the rule $$P'_k = P_k \oplus e_{jk} \qquad (5)$$

where again K varies as in (4).

Let us show this operation by a simple example. Example — Given a system contains three data cartridges and one parity cartridge.

$$\begin{bmatrix} 1 & 1 \\ 0 & 1 \end{bmatrix} \quad \begin{bmatrix} 0 & 1 \\ 0 & 1 \end{bmatrix} \quad \begin{bmatrix} 1 & 0 \\ 1 & 1 \end{bmatrix} \quad \begin{bmatrix} 0 & 0 \\ 1 & 1 \end{bmatrix}$$

$c_1$ $c_2$ $c_3$ $c_p$

If a new $c'_3$ comes to replace $c_3$, $$\text{say } c'_3 = \begin{bmatrix} 1 & 0 \\ 0 & 1 \end{bmatrix},$$

then the $c_p$ is updated by $$c'_p = c_p \oplus c_3 \oplus c'_3$$

$$c'_p = \begin{bmatrix} 0 & 0 \\ 1 & 1 \end{bmatrix} \oplus \begin{bmatrix} 1 & 0 \\ 1 & 1 \end{bmatrix} \oplus \begin{bmatrix} 1 & 0 \\ 0 & 1 \end{bmatrix} = \begin{bmatrix} 0 & 0 \\ 0 & 1 \end{bmatrix}$$

Therefore, the new data base is shown as follows:

$$\begin{bmatrix} 0 & 1 \\ 0 & 1 \end{bmatrix} \quad \begin{bmatrix} 0 & 1 \\ 0 & 1 \end{bmatrix} \quad \begin{bmatrix} 1 & 0 \\ 0 & 1 \end{bmatrix} \quad \begin{bmatrix} 0 & 0 \\ 0 & 1 \end{bmatrix}$$

$c_1$ $c_2$ $c_3$ $c_p$

Notice that the cartridges $c_1$ and $c_2$ never enter the updating operation. Therefore, the required updating operation is independent of the number of cartridges to generate the parity cartridge.

Figure 3:
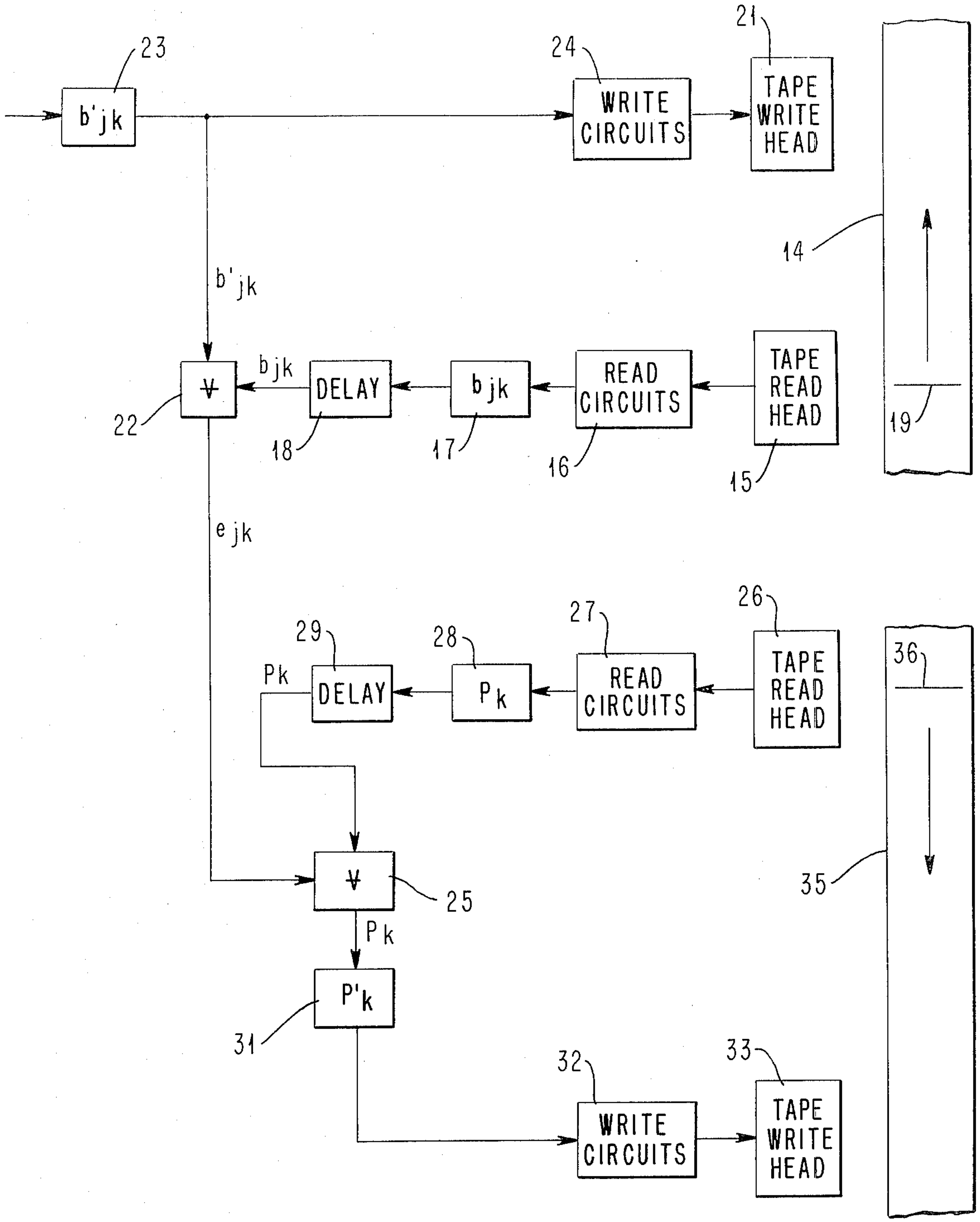
FIG. 3 illustrates how the parity cartridge is updated as the data in a data cartridge is changed.

Now referring to FIG. 3 the apparatus for performing the updating function can be seen. As shown, there are two read/write stations, one associated with the storage cartridges 11 and the other associated with the parity bit cartridge 13. These read/write stations perform a read operation before they perform a write operation on tape in the cartridges. Data bit $b_{jk}$ on the tape 14 of storage cartridge $c_j$ is read by tape head 15, processed through the read circuits 16 associated with the tape head 15, and then through a buffer amplifier 17 for the old data on the tape. The buffer amplifier 17 feeds the signals through a delay circuit 18 which delays the signal read from the tape 14 sufficiently to allow it to reach the two-way Exclusive OR 22 simultaneously with the signals constituting the new data bit $b'_{jk}$. Of course, transmission of the new data bit signals must await the movement of position 19 on the tape 14 from read head 15 to write head 21. Then the new data signals are fed through buffer 23, the write circuits 24, and tape head 21 and also into the Exclusive OR 22.

The output of Exclusive OR 22 is fed into a second two-way Exclusive OR 25 along with the parity bit $P_k$ which has been read off tape 35 by tape head 26 passed through read circuit 27 and buffer 28 to a delay circuit 29 that simultaneously feeds it into the Exclusive OR 25 along with the output $c_{jk}$ of the first Exclusive OR 22. The output $P'_k$ of this two-way Exclusive OR 25 is fed back through buffer 31, write circuits 32, and write tape head 33 to be written on the tape 35 at location 36 of the tape which has moved under write tape write head 31 during the delay provided by the delay circuit 29. Therefore, the circuitry required to generate and update the parity bit cartridge 13 is quite simple. As you can see, all that is required in addition to the usual tape head circuits is a number of buffers and delays and two two-way Exclusive OR circuits. This apparatus can also be used to reconstruct data contained on any cartridge when it is lost due to some catastrophic failure.

This can be seen from the following analysis: if any single cartridge, say $c_j$, in the series $c_1, c_2, \ldots, c_n$, has uncorrectable errors, its information can be reconstructed using the parity relationship:

$$b_{jk} = P_k \oplus \Sigma b_{ik} \qquad (6)$$

$$i \neq j$$

$$i = 1, 2, \ldots, n$$

This implies, of course, that all data cartridges 11 and the parity cartridge 13 have to be read for the reconstruction procedure. Also, it requires some means of detecting that part or all of the data in $c'_j$ is destroyed and cannot be recovered to initiate the recovery procedure. This normally would be the error detection and correction system used by the tape system indicating that an uncorrectable error exists on one of the cartridges. However, mechanical indicia, such as detections of jammed or bent condition, can also be employed to initiate the recovery procedure.

As previously pointed out, the data can be reconstructed using the same apparatus employed for updating of the parity cartridge, or, in other words, the structure shown in FIG. 3 can also be used to perform function (3). The equipment would operate in the same manner as it does when performing the updating operation described previously. However, this time tape 35 would be the tape of new cartridge $c'_j$ and tape 14 would be the tape of either one of the good storage cartridges $c_1, c_2, \ldots c_{i \neq j}$ or of the check cartridge P. Initially the new cartridge $c'_j$ would store a binary 0 in each of its bit positions and n different "updating" operations would be performed on it, each with a different one of the good storage cartridges or the check cartridge. After the n updating operations were complete cartridge $c'_j$ will contain the data that was on cartridge $c_j$ prior to its destruction.

The initial generation of the parity bits in the check cartridge P, or function (2), can be performed in the same manner as function (3). Here the tape 35 would be the tape of the check cartridge P while the tape 14 would be one of the data cartridges $c_1, c_2, \ldots c_n$. Initially, the check cartridge P would have all binary 0's written into it. However, after n modified updating operations each with a different one of the storage cartridges $c_1, c_2, \ldots c_n$, check cartridge P would contain the parity bits for the library of cartridges $c_1$ to $c_n$.

While we have shown only one check bit cartridge for the whole library of data cartridges it is obvious that more than one can be employed. In fact, as n becomes very large, the reliability of the data recovery scheme may suffer since, in general, only one out of n can be recovered unless a more powerful code, such as Hamming, is used to generate the bits in the check cartridges. This, of course, would also require more than one check cartridge for the n storage cartridges.

While the invention has been particularly shown and described with reference to a preferred embodiment thereof, it will be understood by those skilled in the art that the above and other changes in form and details may be made therein without departing from the spirit and scope of the invention.

What is claimed is:

1. In a storage system having a plurality of separate storage units, a data protection system for preventing the loss of more data in one of the units than is correctable by an error correction and detection scheme to protect the data in each of the units, comprising:

a check unit containing check bits for a plurality of the storage units on a bit position by bit position basis wherein each of said check bits is the Exclusive OR summation of the bits of a single bit position in all the storage units in the plurality of storage units;

update means including two read before write station means that read the data in a bit position of a separate one of the storage units and the check unit before writing data in the same bit position for updating check bits of the check unit each time a bit in one of the plurality of storage units is changed said update means including means in one of said read before write stations for obtaining a first Exclusive OR sum of the original and new values for any changed digit and means in said other read before write station for obtaining the Excluisve OR sum of the results of the first Exclusive OR sum and the check bit in the changed bit position to generate the updated check bit covering data in the changed bit position;

restore means including the two read before write station means that read the data in a bit position of a separate one of the storage or check units before writing data in the same bit position for exclusive ORing the data in the check unit with the data in all the storage units other than said one storage unit to reproduce data in said one storage unit when the data in said one storage unit is uncorrectable by said error correction and detection scheme whereby catastrophic losses of data are prevented.

2. The storage system of claim 1 wherein said restore means includes:

means at one of said stations for reading the data out of each of the storage units not containing a catastrophic loss and the check unit to produce a restore output; and means at the other of the stations for Exclusive ORing said restore output with a new storage unit containing all binary zeros to reproduce the destroyed data.

* * * * *